United States Patent [19]
Schiek

[11] Patent Number: 5,101,957
[45] Date of Patent: Apr. 7, 1992

[54] INDEXING ASSEMBLY FOR A CONVEYOR SYSTEM

[76] Inventor: Robert J. Schiek, 1160 NW. North River Dr., Ste. 17, Miami, Fla. 33136

[21] Appl. No.: 603,229

[22] Filed: Oct. 25, 1990

[51] Int. Cl.$^5$ .............................................. B65G 47/28
[52] U.S. Cl. .................................. 198/419.1; 53/246; 53/251; 99/427; 198/431
[58] Field of Search ............... 198/419.3, 431, 419.1; 53/246, 251, 534; 99/427, 443 C

[56] References Cited

U.S. PATENT DOCUMENTS

| | | | |
|---|---|---|---|
| 3,225,513 | 12/1965 | Ehe | 198/431 |
| 3,470,674 | 10/1969 | Madonia | 53/534 X |
| 3,555,770 | 1/1971 | Rowekamp | 53/251 X |
| 4,009,553 | 2/1977 | Monjo | 53/246 X |
| 4,114,752 | 9/1978 | Schiek | 53/534 X |
| 4,316,534 | 2/1982 | Lummins | 198/431 X |
| 4,332,121 | 6/1982 | Nigrelli | 53/251 |
| 4,945,825 | 8/1990 | Florindez | 53/534 X |

FOREIGN PATENT DOCUMENTS

| | | | |
|---|---|---|---|
| 0340468 | 11/1989 | European Pat. Off. | 198/431 |
| 0074991 | 7/1978 | Japan | 53/246 |

*Primary Examiner*—Robert P. Olszewski
*Assistant Examiner*—James R. Bidwell
*Attorney, Agent, or Firm*—Malloy, Downey & Malloy

[57] ABSTRACT

An indexing assembly designed for use in combination with a conveyor assembly which includes a feeding conveyor for pans, each of which has a plurality of receiving molds therein in which dough is delivered on a synchronized basis by a separate conveyor than the pan feeding conveyor. The subject indexing assembly is provided to properly orient and position the individual pans as well as the receiving molds therein into receiving relation to the quantities of dough, or other objects being delivered, in a predetermined and preferred indexed manner so as to eliminate waste of product or the delivery of the dough to a portion of the pan other than the receiving mold.

9 Claims, 4 Drawing Sheets

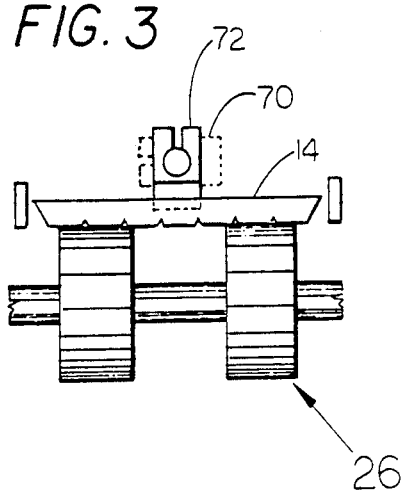
FIG. 3
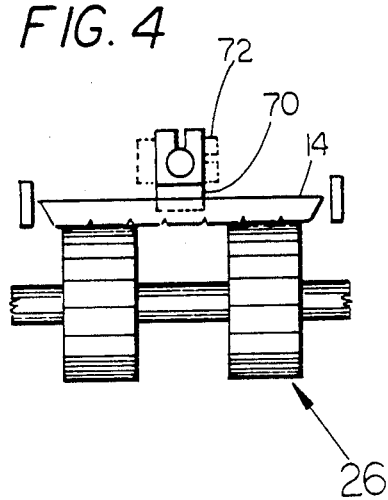
FIG. 4
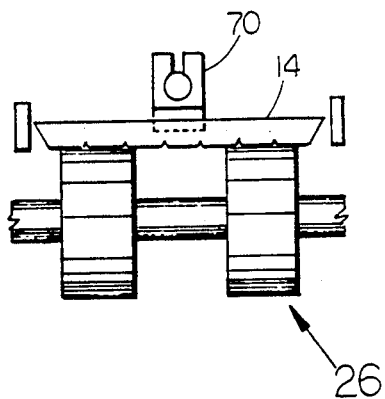
FIG. 5 - PRIOR ART
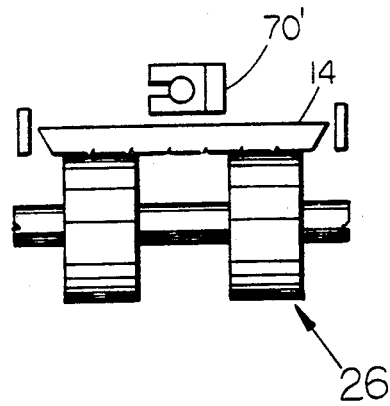
FIG. 6 - PRIOR ART

INDEXING ASSEMBLY FOR A CONVEYOR SYSTEM

BACKGROUND OF THE INVENTION

1. Field of the Invention

The present invention relates to an indexing assembly associated with a conveyor system of the type designed to concurrently deliver and position baking pans with a delivery conveyor for dough or like objects to the extent that the dough is delivered, in proper sequence and position to receiving molds within the individual pans on a continuous, automatic basis.

2. Description of the Prior Art

In the commercial production of baking goods, it is common practice and quite well known to utilize a conveyor system to coordinate and automatically accomplish the positioning of dough products, for example, in the proper position within baking pans and/or pans used as the packaging for sale to consumers. In synchronizing the delivery of the dough product to the pans and more specifically, to specific receiving molds within such pans, it is common practice to use what may be broadly referred to as an indexing assembly. Typically, such indexing assembly generally regulates the position of the successive pans relative to a conveyor structure which delivers the dough products thereto taking into consideration the speed of the conveyor on which the pans travel as verses the speed of the conveyor on which the dough products travel. Typically, prior art indexing systems of the type referred to include a rotatably mounted shaft having a plurality of spaced apart fingers each defining a pan stop. Typically, the prior art includes such stops being disposed in an outwardly extending relation to the rotating shaft on which they are mounted to the extent that all of the fingers defining such pan stops extend outwardly from the shaft in a common direction and are disposed in parallel relation to one another. Based on this prior art structure, the pans being indexed are in fact only "in index" when the aforementioned commonly oriented pan stops are in a down or interruptive position. When such prior art pan stops rotate out of such interruptive position, the pans proceed to the next indexed position based on the speed of the pan feed conveyor. The pans are attempted to be kept in index or in synchronization with the delivery of the dough products based solely on the speed of the pan feed conveyor. However, if the feed conveyor is going too fast, the pans will overtravel the next index position and there will be one row of vacant receiving molds in the receiving pan.

Therefore, due to the extensive utilization of separate feed conveyors, there is a need in this area to provide an indexing assembly which is simple in nature but yet more efficient than the indexing assemblies or structures presently being used and as described above with regard to the prior art. More specifically, the pans being delivered should be controlled by a preferred indexing assembly to the extent that the plurality of pans being fed along the pan feed conveyor are effectively never out of index.

SUMMARY OF THE INVENTION

The present invention relates to an indexing assembly of the type used in combination with a conveyor system incorporating at least two different feed conveyors. More specifically, the subject indexing assembly is primarily designed to maintain a plurality of pans being fed along a pan feed conveyor in proper indexed position relative to dough products or the like being delivered to the pans and more specifically, to receiving molds therein by a separate delivery or feed conveyor. Further, the structure of the present invention provides for the pans always being maintained in an indexed position as versus the prior art structure wherein maintenance and reliability of the pans being fed was dependent, in certain instances, to the speed of the pan feed conveyor rather than the structure of the indexing assembly being disposed continuously in an indexing position.

The indexing assembly of the present invention comprises a support frame having at least one but alternately, a plurality of elongated, rotatably mounted indexing shafts thereon. The indexing shaft is rotatable by a drive means which in turn may be a hydraulically or neumatically activated piston and cylinder arrangement designed to be reciprocally operative between an outward stroke and an inward stroke. Each of the aforementioned strokes results in rotation of the indexing shaft first in one direction and then in the opposite direction a distance equal to the length of the stroke.

An important feature of the present invention is the provision of a plurality of stops attached in predetermined spaced relation to one another and extending outwardly from the shaft in a predetermined direction. More specifically, alternately positioned and adjacent ones of the stop members are displaced 90° from one another such that they extend outwardly from the shaft on which they are mounted in directions which are perpendicular to one another. Further, alternate ones of the stop members extend in a common direction and are disposed in spaced but parallel relation to one another. Therefore, activation of the drive cylinder in an outward stroke forces one set of alternately positioned pans stops into abutting and/or engaging and stopping relation to a correspondingly positioned pan traveling on a pan feed conveyor. Activation of the drive cylinder to accomplish a reverse stroke cause the next adjacent alternating stops to be positioned from a non-engaging or stopping relation into the indexing position for stopping engagement with the pan a spaced distance from the first set of stops. Accordingly, continuous activation of the drive cylinder between an outwardly directed stroke and an inwardly directed stroke causes at least one of the alternately positioned sets of stops always to be in an indexed position relative to a correspondingly positioned pan. By virtue of this structure, any of the pans being fed along the pan feed conveyor will always remain "in index" and such proper indexed position will never rely solely on the speed of the pan feed conveyor as is prevalent with prior art structures.

Other features of the present invention include the support frame and accordingly, the indexing shaft and pan stops mounted thereon to be automatically adjustable longitudinally along with any change in longitudinal adjustment or positioning of the pan feed conveyor. This is due in part to the fact that an aligner assembly and a stabilizer assembly work together so at to maintain the track on a carriage due to supporting rollers such that any manual or otherwise longitudinal adjustment of the conveyor will be automatically transferred to repositioning, longitudinally, of the support frame for the indexing shaft and the pans stops mounted thereon.

BRIEF DESCRIPTION OF THE DRAWINGS

For a fuller understanding of the nature of the present invention, reference should be had to the following detailed descriptions taken in connection with the accompanying drawings in which:

FIGS. 3 and 4 are end views in schematic form of indexing positions of the present invention.

FIGS. 5 and 6 are end views of prior art indexing systems of the type demonstrated in 2A.

Like reference numerals refer to like parts throughout the several views of the drawings.

DETAILED DESCRIPTION OF THE PREFERRED EMBODIMENT

Figure 1:
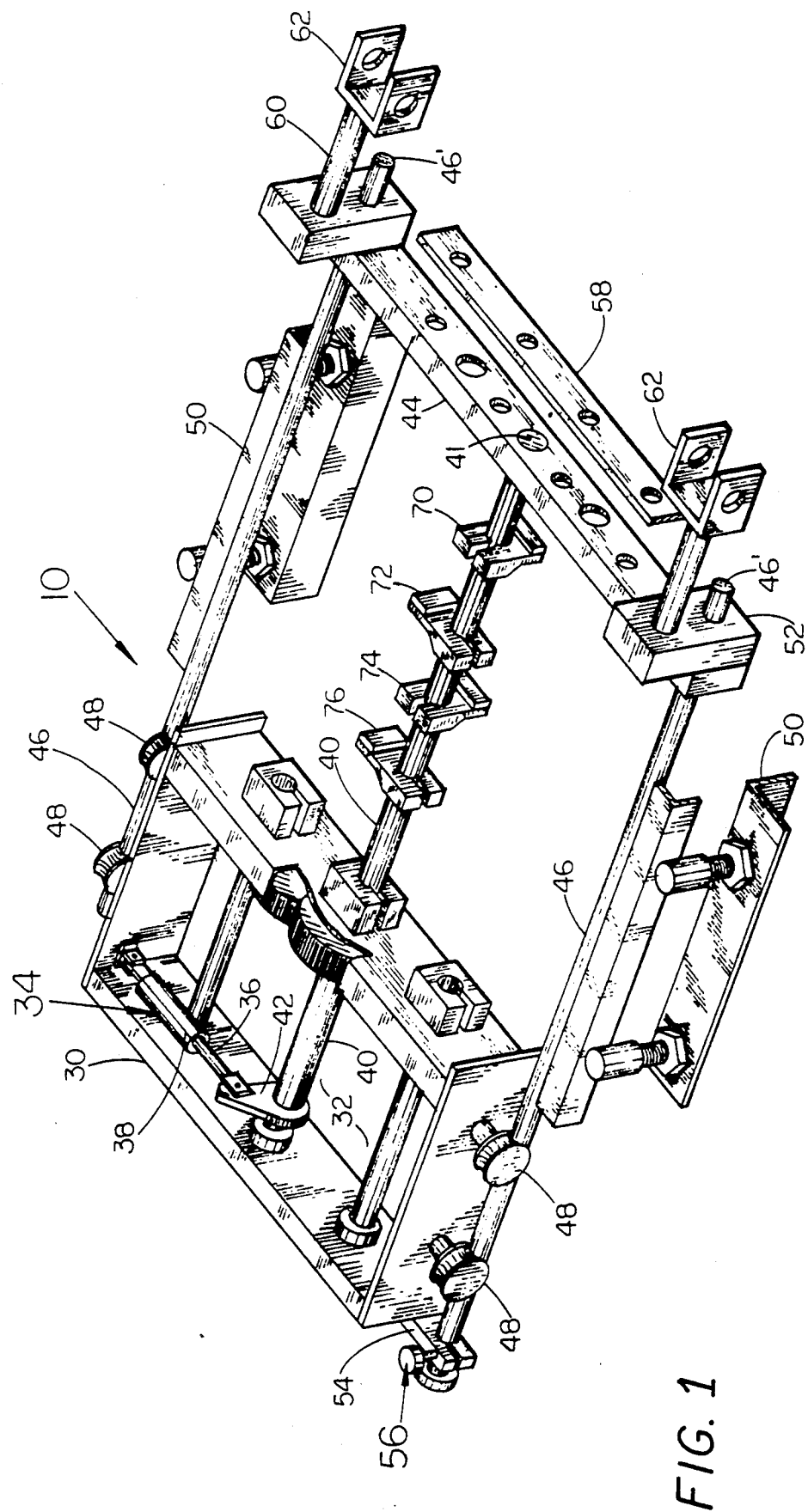
FIG. 1 is a perspective view of the index assembly of the present invention.
Figure 2A:
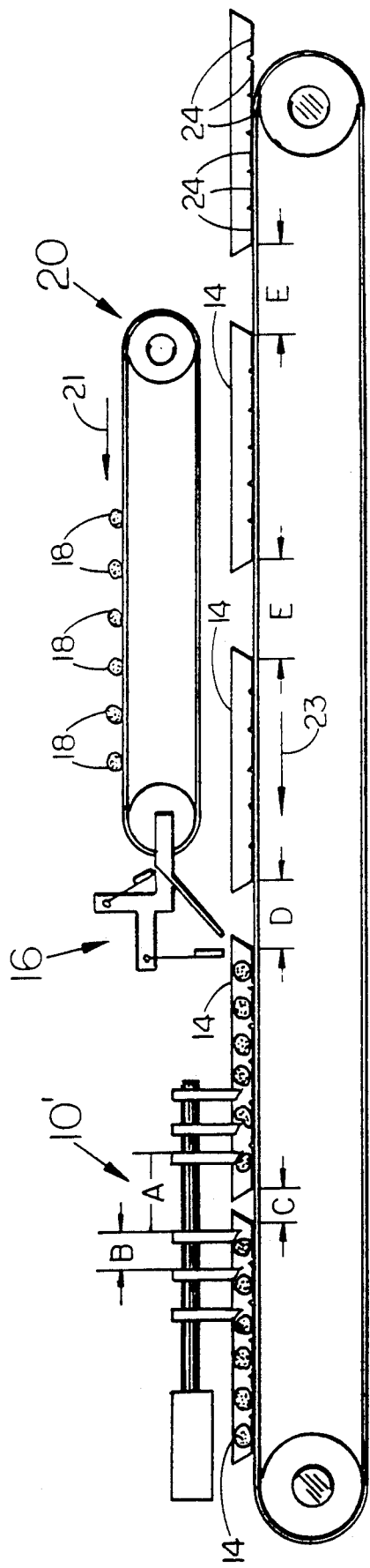
FIG. 2A is a side view in partial schematic of a prior art conveyor and cooperative indexing assembly.

FIG. 1 shows a perspective view of the indexing assembly of the preferred embodiment. However, for purposes of clarity, reference should first be had to FIG. 2 and 2A wherein FIG. 2A represents prior art structure. A brief explanation of these figures indicates that in both the indexing assembly of the present invention as generally indicated as 10 and the prior art indexing assembly as generally indicated as 10', both are associated with a pan feed conveyor generally indicated as 26 on which a plurality of pans 14 travel into registry with a delivery station generally indicated as 16. At the delivery station, a plurality of dough products 18 are delivered from a feed conveyor traveling in the direction indicated by directional arrow 21 to the delivery station 16. Similarly, the pan feed conveyor traveling in a common direction as indicated by directional arrow 23 positions the pan in receiving relation to the delivery structure or station 16 for receipt of the dough products 18 therein. Further, each of the pans are specifically structured to receive the dough products from the product feed conveyor 20 on the interior thereof. In addition, each of the pans includes a plurality of receiving molds or pockets as at 24. It should be readily apparent therefore that both with the prior art as shown in FIG. 2A and with the indexing assembly 10 of the present invention, it is the goal to properly position each of the products 18 not only in the appropriately disposed and correspondingly positioned pans 14 but also in the various receiving molds 24 formed therein.

Figure 2:
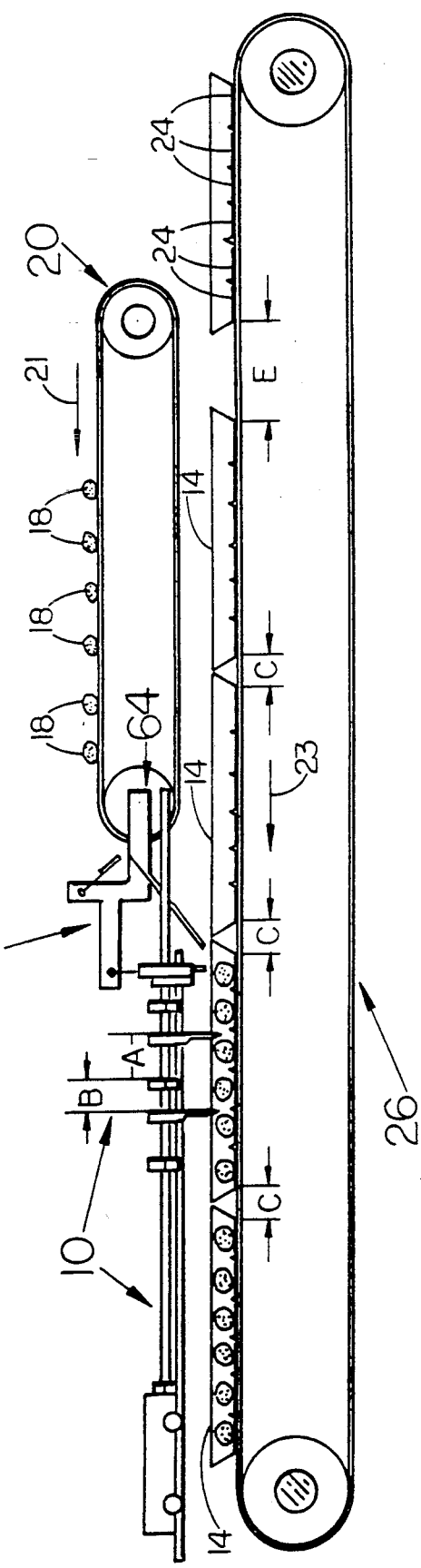
FIG. 2 is a side view in partial schematic form of the indexing assembly of the present invention associated with a conveyor system.

With regard to the differences between the operational structure and proper indexing of the pans 14, designation A in both figures represents the distance between a first pan and a next adjacent second pan, measured from the inside of each pan when both pans are together or in abutting relation to one another, plus the size of the pan receiving mold 24, as shown in both FIGS. 2 and 2A. Item C is the distance between pans 1 and 2 or the next adjacent pans. Designation E is the distance between pans on the pan feed conveyor 26 as they travel along prior to reaching the delivery station 16 and the indexing mechanism 10. Designation D is the distance between pans after the successively preceding pans have been or are being indexed. Designation B is the distance between the receiving molds 24 in each of the pans. To have proper indexing, the dough objects 18 go into the receiving molds 24 of the receiving pan. The pans, through proper functioning of the indexing assembly 10 (FIG. 2) are abutted with one another so there is no dough lost as in an inadvertent spacing between the pans when the dough being delivered from delivery station 16 falls on the floor or rests between the pans on the conveyor 26.

The details of the indexing assembly are shown in FIG. 1 and include a support frame 30 having a drive section as generally indicated as 32. A drive means comprises a drive piston and cylinder arrangement generally indicated as 34 which may be either hydraulically or neumatically driven. The piston and cylinder arrangement as at 34 includes a drive piston 36 and a activating cylinder 38 driven successively between outer extending and inwardly directed strokes as is conventional. The piston and cylinder assembly 34 drivingly rotates, in successively opposite directions, the indexing shaft 40 by virtue of a fixedly attached connecting link 42. The shaft extends along its length to its opposite end where it is terminated and connected, for support, as at 41 with a stabilizer bar 44. The frame is movably mounted onto a support track 46 by a plurality of outwardly extending spaced apart rollers 48. It should be readily apparent therefore, that the frame as well as the indexing shaft 40 is adjustable longitudinally along the length of the supporting track 46. Mounting braces or like members as at 50 may be used to attach the entire indexing assembly 10 in appropriate operative position as generally shown in FIG. 2. The stabilizer bar 44 is slidingly connected to the track rails 46 by virtue of mounting brackets 52 which are slideably mounted generally on the ends of the tracks as at 46'. A stop bar is located rearwardly of the support frame 30 as at 54 and may be fixedly attached between the track rails 46 by an appropriate and conventional locking assembly generally indicated as 56. Also, an indexing shaft stop bar 58 may be positioned to limit the forward travel of the indexing shaft 40 and accordingly, the support frame 30 relative to the stabilizer bar 44 and the conveyor.

Mounting arms and appropriately attached brackets 60 and 62 respectively, are attached at the opposite ends thereof to the stabilizer bar 44 through the aforementioned mounting brackets 52. The brackets 62 are attached for movement with an end portion of the object feed conveyor as generally indicated at 64 (see FIG. 2). Accordingly, it should be apparent that manual adjustment, longitudinally of the overall length for positioning of the conveyor 20 will in effect serve to automatically reposition and align the indexing assembly 10 due to the interaction of the components aforementioned.

An important feature of the present invention is the existence of a plurality of pan stops 70, 72, 74, 76, etc. A plurality of such pan stops may vary in number and specific placement and their relative position longitudinally along the length of the indexing shaft 40 relative to one another is dependent upon the factors set forth with regard to the designations A through E as set forth with regard to the explanation of FIGS. 2 and 2A. In any event, an important feature of the present invention is the 90° or perpendicular out of phase orientation of alternating ones of the pan stops. More specifically, when the driving, piston and cylinder arrangement 34 is in its outer most stroke as shown in FIG. 1, a first set of the plurality of pan stops as at 70, 74, etc. are disposed in a downward, abutting and stopping relation to the various pans 14 and/or the receiving molds 24 therein. Accordingly, the pans are maintained in proper indexed position due to their respective engagement with the fingers 70, 74, 78, etc. which are in the indexed position.

An inwardly directed stroke of the piston and cylinder drive assembly 24 will in fact cause the rotation of the indexing shaft 40 in the opposite direction such that a second set of alternating pan s tops 72, 76, etc. will then be positioned in the downwardly extending indexed position in stopping and abutting engagement with the pans and/or the receiving molds 24. Subsequently, the successively alternating pan stops 72, 76, 78, etc. will be rotated out of indexed position and out of abutting engagement with the pans and/or receiving molds 14 and 24 respectively. By virtue of this structure, the pans at all times will be disposed in an indexed position and accordingly, problems existing in the prior art will be overcome. Namely, such problems as the reliance on the speed of the conveyor 26 to properly index or position the pans in receiving relation to the objects 18 coming off the object delivery conveyor 20 will be eliminated. To the contrary, at all times at least one set of the pan stops 70, 72, 74, 76, etc. will be in an indexing position relative to the pans.

With reference to FIGS. 5 and 6, FIG. 5 shows an end view in partial schematic form with one of the pan stops in a down position serving to stop the pan in a proper indexed position. Rotation of the indexing shaft 40 serves to rotate the same pan stop to a non-abutting or stopping relation to the correspondingly positioned pan thereby allowing the pan to move the next indexed position. In this structure, representing the prior art, there is nothing to prevent the pans from "overrunning" the next preset indexed position except the speed of the pan conveyor 26.

Figure 7:
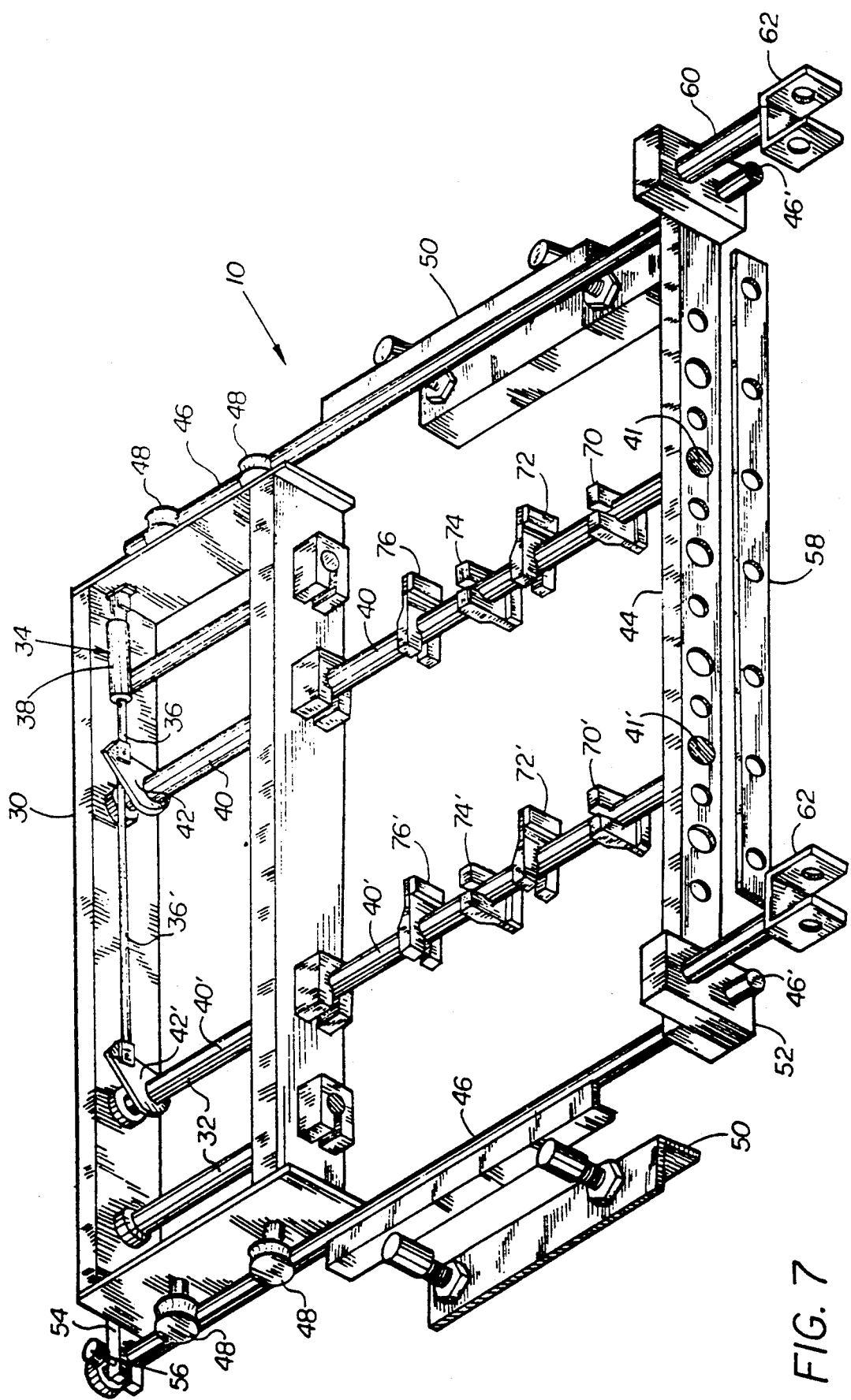
FIG. 7 is a perspective view of an alternative embodiment of the indexing assembly illustrating a plurality of index shafts thereon.

FIGS. 3 and 4 show the indexing assembly of the present invention wherein the pan stop engages the correspondingly positioned pan for positioning in a first preselected indexed position. In FIG. 4, the next successive pan stop is shown in a downwardly engaging and stopping position wherein the next successive pan stop is indexed out of position once the driving piston and cylinder arrangement has reversed its stroke. By virtue of the preferred structure of FIGS. 3 and 4, the corresponding pans are always in an indexed position and there is no chance of inadvertent overrun of the pan based on the speed of the feed conveyor 26. FIG. 7 illustrates an alternative embodiment of the indexing assembly of the present invention wherein a plurality of indexing shafts 40, 40' are fitted to the frame 30 in parallel spaced relation to one another. Each of the indexing shafts include a first set of pan stops, as at 70', and 74, 74' as well as a second set of pan stops as at 72, 72' and 76, 76'. The indexing shafts 40, 40' are interlinked to one another so as to rotate concurrently upon an outward or inward stroke of the drive assembly 24.

Now that the invention has been described,
What is claimed is:

1. An indexing assembly for use with a conveyor system including a pan conveyor movably supporting a plurality of successively positioned pans each having a plurality a receiving molds therein and a delivery conveyor disposed to deliver a plurality of objects each to a different receiving mold in the plurality of pans, said indexing assembly comprising:

(a) a support frame disposed adjacent a path of travel of the plurality of pans and including an index bar rotatably mounted on said frame,
(b) a first plurality of pan stops secured to said index bar in predetermined spaced relation to one another thereon, equal to a distance between the receiving molds in each pan, each stop extending transversely outward from said index bar a distance sufficient for interruptive and stopping engagement to the plurality of pans moving with the pan conveyor,
(c) a second plurality of pan stops arranged in alternating sequence to said first plurality of pan stops on said index bar, each of said second plurality of pan stops oriented at substantially a 90° position relative to a next adjacent one of said first plurality of pan stops and spaced therefrom a distance equal to the intended distance to be maintained between successive pans being indexed on the pan conveyor, and
(d) drive means driving connected to said index bar for reciprocally rotating the index bar in opposition directions and continuously positioning one of either said first plurality of pan stops or said second plurality of pan stops in an indexing, stopping engagement with a correspondingly positioned pan.

2. An assembly as in claim 1 wherein second plurality of pan stops extend transversely outward from said index bar a distance sufficient for interruptive and stopping engagement to the plurality of pans moving with the pan conveyor; each of said second stops oriented at a substantially 90° position relative to a next adjacent stop and each of said second plurality of stops disposed in a parallel common orientation relative to one another. A predetermined distance between said second stops substantially equal to a distance between the receiving molds of each pan.

3. An assembly as in claim 1 further comprising a plurality of index bars disposed in parallel relation to one another and each spaced a sufficient lateral distance from one another for operative alignment with a different plurality of pans.

4. An assembly as in claim 3 wherein each of said index bars rotatably support a different first and second plurality of stops thereon.

5. An assembly as in claim 4 wherein said drive means is structured for concurrent reciprocal rotation of each of said index bars and respective ones of said stops thereon into operative indexing relation with a correspondingly positioned plurality of pans.

6. An assembly as in claim 1 wherein said drive means includes a drive cylinder having a reverse stroke reciprocal drive piston attached in rotatably driving engagement with said index bar, said index bar reciprocally rotating in opposite directions for each reverse stroke of said piston.

7. An assembly as in claim 5 wherein said drive means includes a drive cylinder including a reverse stroke reciprocal drive piston attached in rotatably driving engagement with one of said plurality of index bars; gear means drivingly interconnecting said one index bar with the other of said plurality of index bars for concurrent, reciprocal rotation of each of said plurality of index bars.

8. An assembly as in claim 1 wherein said support frame is movably supported on a track assembly and further includes an alignment assembly connected thereto, said alignment assembly secured to said delivery conveyor and movable therewith upon longitudinal adjustment of said delivery conveyor.

9. An assembly as in claim 8 wherein said index bar is connected to said alignment assembly and movable linearly therewith upon longitudinal adjustment of said delivery conveyor, said support frame adjustably movable longitudinally with said index bar upon longitudinal adjustment of said delivery conveyor, whereby longitudinal adjustment of the delivery conveyor automatically longitudinally adjusts said support frame, index bar and stops thereon.

* * * * *